United States Patent [19]

May et al.

[11] Patent Number: 4,811,277
[45] Date of Patent: Mar. 7, 1989

[54] COMMUNICATION INTERFACE

[75] Inventors: Michael D. May; Henry M. Chesney, both of Bristol, England

[73] Assignee: INMOS Limited, Bristol, England

[21] Appl. No.: 756,992

[22] PCT Filed: Nov. 2, 1984

[86] PCT No.: PCT/GB84/00376

§ 371 Date: Jul. 3, 1985

§ 102(e) Date: Jul. 3, 1985

[87] PCT Pub. No.: WO85/02041

PCT Pub. Date: May 9, 1985

[30] Foreign Application Priority Data

Nov. 4, 1983 [GB] United Kingdom ............... 8329510

[51] Int. Cl.⁴ .................................................. G06F 13/00
[52] U.S. Cl. ..................................... 370/94; 364/900
[58] Field of Search .................... 364/200, 900; 370/80, 370/85, 94, 60

[56] References Cited

U.S. PATENT DOCUMENTS

| 3,648,256 | 3/1972 | Paine et al. | 364/200 |
|---|---|---|---|
| 3,866,172 | 2/1975 | Caron . | |
| 4,156,798 | 5/1979 | Doelz | 364/200 |
| 4,399,531 | 8/1983 | Grande et al. | 370/94 |
| 4,490,785 | 12/1984 | Strecker et al. | 364/200 |
| 4,490,788 | 12/1984 | Rasmussen | 364/200 |
| 4,507,782 | 3/1985 | Kunimasa et al. | 370/60 |
| 4,584,679 | 4/1986 | Livingston et al. | 370/94 |

OTHER PUBLICATIONS

T. H. Beeforth et al., "Proposed Organization for Packet Switched Data Communication Network", Proceedings IEE, vol. 119, No. 12, Dec. 1972.

G. W. Knapp, "Chip Topography for Integrated Circuit Communication Controller", International Application, Jun. 24, 1982.

"Transputer does 5 or more Mips even when not used in Parallel", by Barron et al., Electronics International, vol. 56, Nov. 17, 83, No. 23, pp. 109-115.

Preliminary Data Sheet Entitled "IMS T424 Transputer", dated Nov. 1984.

IBM Tech. Discl. Bull., vol. 25, No. 10, Mar. 1983, "Prevention of Redundant Frame Transmission in Closed-Ring Networks", Written by Weiss, pp. 5252-5253.

Primary Examiner—Eddie P. Chan
Attorney, Agent, or Firm—Edward D. Manzo

[57] ABSTRACT

A communication interface for effecting communication by serial bit packets on unidirectional non-shared lines comprises a packet generator 70 arranged to output a byte of data in a data packet of a first format or an acknowledgement packet of a second format and a packet decoder 71 is arranged to decode incoming packets.

19 Claims, 7 Drawing Sheets

DATA PACKET

ACKNOWLEDGE PACKET

COMMUNICATION INTERFACE

The invention relates to communication interfaces and is particularly applicable to communication interfaces for use with computer apparatus and the transmission of messages between computers or computers and other devices connected thereto. The invention is particularly applicable to message transmission between integrated circuit devices.

BACKGROUND TO THE INVENTION

Computer devices and other integrated circuit devices may need to transmit messages to or receive messages from other devices. In some cases the message transmission may occur between two interconnected devices or between a large number of devices forming a network. In such a network one or more of the devices may be in the form of computer apparatus and other devices may comprises a variety of peripheral equipment.

The transmission of data between the integrated circuit devices can be accomplished by a variety of different techniques. For communication over short distances it is common to use a parallel data bus with many signal wires shared between many devices. For communication over longer distances a serial communication system may be preferred with pairs of devices connected by one or two signal wires. The more devices that a shared bus connects, the slower the maximum speed of operation. This imposed a practical limit on the number of devices which may be connected by a shared data bus. Furthermore, it is inconvenient to use many parallel buses in a system on account of the large number of signal lines and difficulties of arranging for communication between devices attached to different buses. There is no limit to the number of devices which may be connected using individual serial connections between pairs of devices provided that each device is equipped with a number of links to which connections can be made. However, existing serial connection systems are too slow, too big or inappropriate in function to be used for general purpose communications between microcomputers and other devices in a system.

OBJECTS OF THE INVENTION

It is an object of the present invention to provide an improved link interface for use in a serial communication system between communicating devices.

It is a further object to provide a link interface which enables two-way communication two devices using non-shared signal wires.

It is a further object of the present invention to provide a communication interface which enables a standard communication procedure to be used by a variety of devices connected into a common network.

It is a further object of the present invention to provide an improved communication interface which will permit communication between a variety of connected devices which do not have a standard wordlength. In this way communication is permitted between devices which do not all use the same number of bits per word in the process carried internally by each device.

It is a further object to provide an improved communication interface for providing serial bit communication which is independent of wordlength.

SUMMARY OF THE INVENTION

The present invention provides a communication interface to enable communication between a device and a microcomputer, or between devices in a network including one or more microcomputers, which interface comprises an output channel for outputting data and an input channel for receiving data.

The interface includes a packet generator coupled to the output terminal. The packet generator outputs bit packets in serial form. Two different formats can be outputted. The first format is a data packet and the second format is an acknowledgement packet. A packet decoder is provided in the interface and is coupled to the input terminal. It receives serial bit packets, of both the data packet and acknowledgement packet type, and determines whether each received packet is a bit packet or an acknowledgement packet. Interlock control circuitry is coupled to the packet generator and to the packet decoder. This control circuitry is responsive to the receipt of a data packet and causes the packet generator to output an acknowledgement packet. It is also responsive to the output of each data packet to prevent the output of a further data packet until the input channel has received an acknowledgement packet. In this manner, after each data packet is sent by the communication interface, it waits for an acknowledgement signal to be received before sending another data packet.

Preferably the packet generator includes means for controlling the length of each packet so that a data packet includes a standard number of data bits. Preferably the interface is arranged to transmit and receive data packets which each include one byte (eight bits) of data. In this way messages can be trasmitted by use of the interface which are independent of the word length of the transmitting or receiving devices. A succession of data packets may be involved in the message. For either the transmitting or receiving machine the message may consist of one or more words in accordance with the wordlength of the device and this message may be constituted by an appropriate number of bytes.

Preferably the packet generating means includes counter means arranged to count each data bit which is output in a packet and to provide a signal indicating when the number of data bits reaches the standard, whereby the packet generator outputs a predetermined signal to indicate termination of the data packet. Preferably the packet decoder means includes counter means to count the number of data bits received in an incoming data packet and the packet decoding means is arranged to provide a signal when the number of data bits reaches the standard, said signal being received by the control means and arranged to initiate action by the packet generator means to output an acknowledgement packet.

Preferably the packet generator has means for generating a first format bit pattern followed by a succession of data bits in order to output a data packet and a second format bit pattern without data bits in order to output an acknowledgement packet. The first and second format may each be determined by two bits at the start of each packet.

Preferably the input channel and output channel each include a single byte register for holding eight bits of data.

Preferably said control means comprises first latch means settable to one condition in which it provides an output signal to permit output of a data packet by the packet generator means and settable to a second condition in which it inhibits the output of a data packet, said first latch means being arranged to receive a signal from the packet decoding means on receipt of an acknowledgement packet by the input channel in order to set the first latch means to said one condition, and said first latch means being arranged to receive a signal from the packet generator means to set the latch means to said other condition on completion of a data packet output.

Preferably said control means includes second latch means settable to one condition in which it provides a signal indicating to the packet generator means that an acknowledgement packet should be output and settable to a second condition in which it does not provide such a signal, said second latch means being arranged to receive an input responsive to the packet decoding means to indicate that a data packet has been received by the input channel and thereby set said second latch means to said one condition in order to cause output of an acknowledgement packet, said second latch means having a further input responsive to output of an acknowledgement packet by said packet generator means in order to set said second latch means to said other condition.

The signal timing in the input and output channels may be controlled by clock pulses from timing means.

Two communicating devices each incorporating a communication interface as aforesaid may use a common timing clock or alternatively they may be provided with different timing clocks. The clocks having the same frequency without a fixed phase relationship.

To permit use of separate clocks on separate communicating devices, the input channel of the aforesaid communication interface may include synchronising means for sampling the signal level at the input terminal at a frequency higher than the bit frequency of the incoming signal in order to detect a leading edge of a first bit of a packet and to supply to said packet decoding means signal levels after suitable time intervals from detection of said leading edge in order that the signal level may provide a true indication of the bit pattern of the incoming signal regardless of the phase of the incoming signal.

Preferably said synchronising means includes a succession of sampling flip-flops for detecting the leading edge of the first bit of a packet.

The present invention also provides a communication interface as aforesaid forming part of a link unit for connection to any communicating device in order to provide an output mechanism for that device and also to provide an input mechanism for that device. Such a link unit may have suitable connections to the remainder of the device including connections to the input channel comprising an input data path and an input control signal line, and connections to said output channel comprising an output data transmission path and an output control signal line.

The present invention provides a network of two or more devices incorporating communication interfaces as aforesaid either with a common clock or with different clocks.

DETAILED DESCRIPTION OF THE PREFERRED EMBODIMENT

Figure 1:
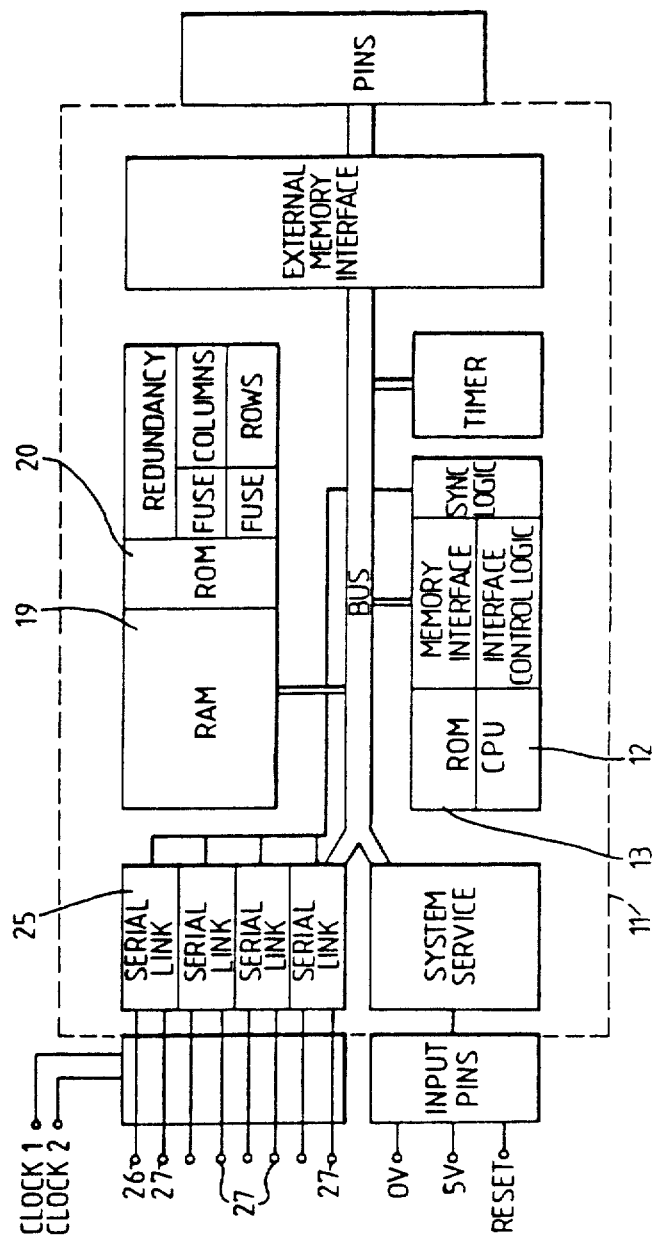
FIG. 1 illustrates schematically a microcomputer of the type described in our European Pat. Specification No. 0111642.
Figure 2:
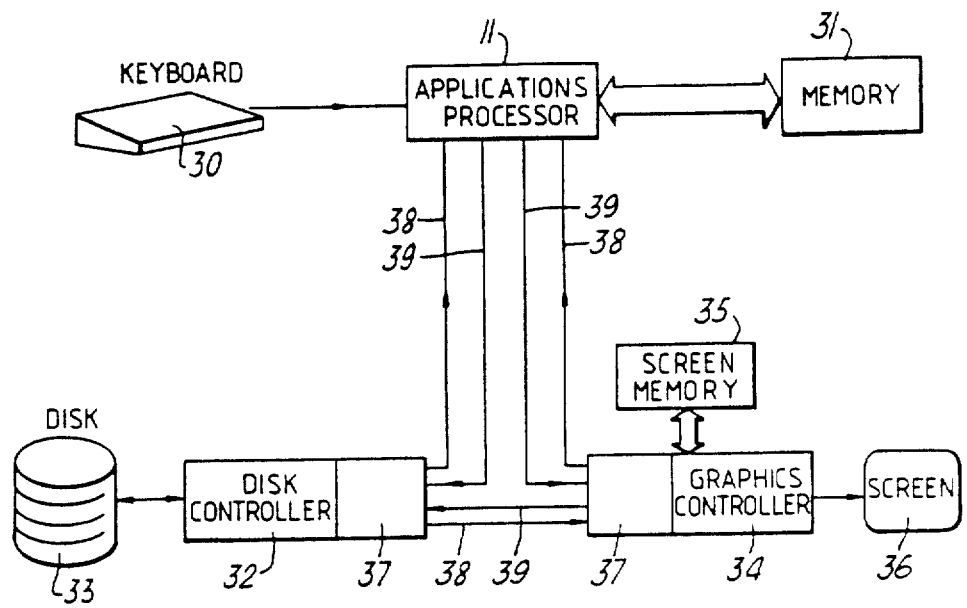
FIG. 2 illustrates a network in which a microcomputer of the type shown in FIG. 1 is incorporated in a personal workstation and connected to device controller incorporating link interfaces in accordance with the present invention.

This example provides a communication interface in the form of a link unit to enable an integrated circuit device to input or output messages so as to communicate with a microcomputer which may be of the form shown in FIG. 1. This is described in our European Pat. Specification No. 0110642 and will not be repeated. However similar reference numerals have been used for similar parts. The single integrated circuit device 11 incorporates a CPU 12 together with a ROM 13 and 20 and RM 19. External communications can be effected through a plurality of serial links each having an input pin 26 and an output pin 27 for a single non-shaped wire connection to a further communicating device. FIG. 2 illustrates an example in which a microcomputer 11 similar to that shown in FIG. 1 may receive input from a keyboard 30 and is connected to an external memory 31. The microcomputer 11 is connected into a network of integrated circuit devices including a disk controller 32 controlling a disk 33 and a graphics controller 34 connected to a screen memory 35 and arranged to control a screen unit 36. The connection between the controllers and the microcomputer 11 are effected by non-shared unidirectional wire connections coupled to serial links 25 on the microcomputer 11. In order to effect satisfactory message transmission each of the controllers 32 and 34 is provided with a link unit 37 which will be described in more detail below.

Figure 3:
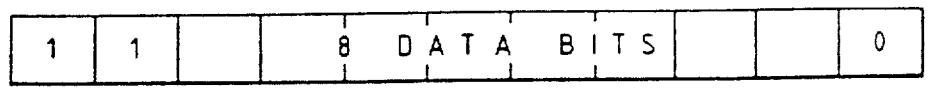
FIG. 3 illustrates the form of a data packet transmitted by a link interface in accordance with the present invention.

Data which is transmitted by one link unit forms part of a data packet having the format shown in FIG. 3. A data packet consists of a start bit of value 1 followed by a further bit of value 1 followed by one byte (eight bits) of data followed by as stop bit of value 0. Such data packets are transmitted on the unidirectional non-shared single wires as indicated at 38 connecting the output pin of one link unit with the input pin of another link unit. On receipt of a data packet each link unit is arranged to output an acknowledgement packet of the type shown in FIG. 4. This consists of a start bit of value 1 followed by a further bit of value 0. When a link unit is not transmitting a packet it continuously transmits a signal of the 0 bit value. Correspondingly a link receives 0 bits and ignores them until it receives the start bit 1 of a packet. By selecting the standard number of data bits for each packet to correspond to one byte of data it enables link units to correspond with each other when they form part of devices which do not have a common wordlength. For example if a machine has a wordlength of eight bits then it need only transmit one data packet for each word. If it has a wordlength of 16, 24 or 32 bits, it will be arranged to transmit two, three or four data packets per word.

Figure 5:
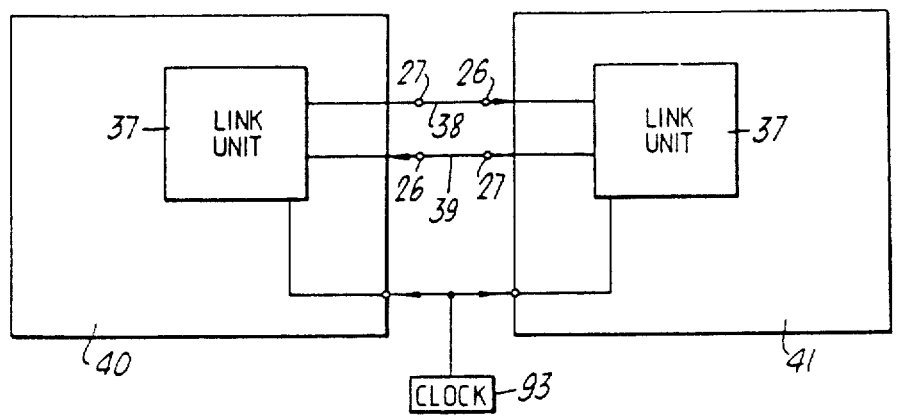
FIG. 5 illustrates schematically the interconnection between two devices each incorporating a link unit in accordance with the present invention.

FIG. 5 illustrates communication between two integrated circuit devices 40 and 41 each incorporating a link unit 37. In this example the integrated circuit devices may comprise a microcomputer. Alternatively one or more of the devices may comprise peripheral equipment such as for example the controllers 32 or 34 in FIG. 2 each incorporating a link unit 37 so that the message transmission system throughout a network of interconnected integrated circuit devices is compatible with the inclusion of one or more microcomputers. In FIG. 5 each link unit 37 is connected to two pins on the device. Both devices have an output pin 27 and an input pin 26. A link between the two devices is formed by connecting the two link units 37 by two unidirectional non-shared wires 38 and 39 interconnecting respective input and output pins and arranged to transmit the bit packets serially along the wires.

It will be appreciated that the link units 37 provide a communication interface which can be connected to any suitable integrated circuit device to enable it to communicate with another or with a microcomputer even where the integrated circuit device was not initially provided with means enabling such communication. In FIG. 5 each of the devices 40 and 41 incorporates means for indicating the source or destination of data to be output or input and it also includes store means such as a register holding a count of the number of bytes of data to be output or input. The link interface will transmit each of the bytes in sequence and provide control signals to the associated device so that the count may be decremented to indicate when the full message is transmitted.

Figure 6:
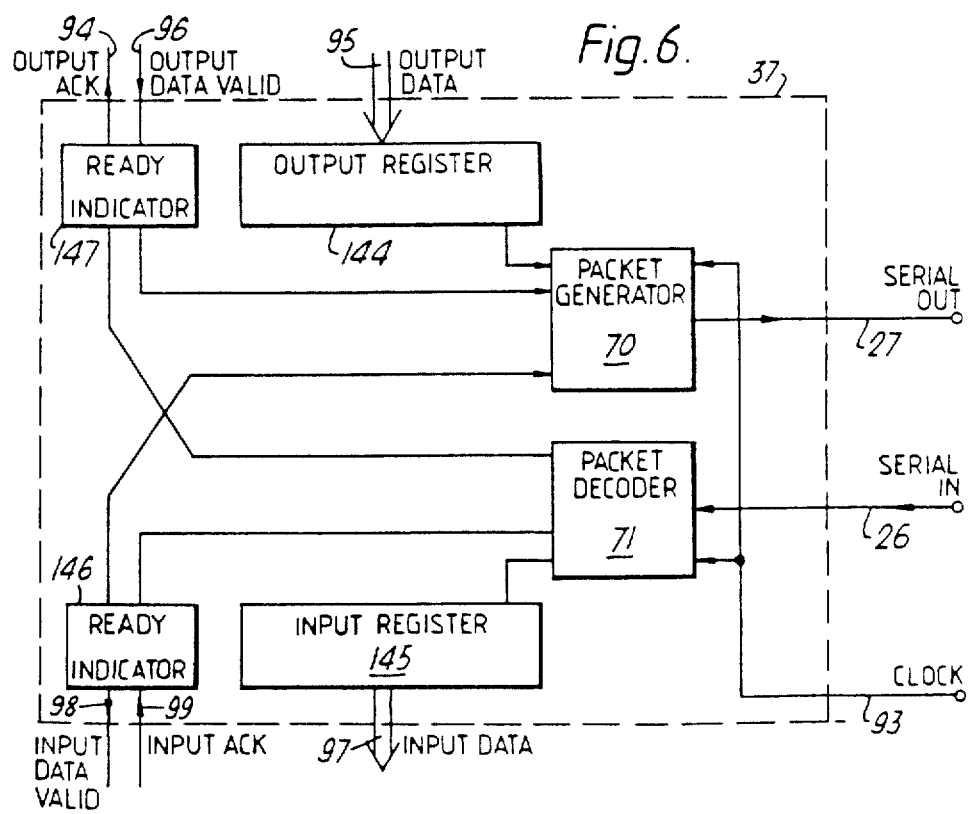
FIG. 6 illustrates further detail of the construction of a link unit in accordance with the present invention.

The link unit will be described more fully with reference to FIGS. 6 and 7. FIG. 6 illustrates one link unit 37 and includes a single byte (8 bit) output register 144 which is used to hold data for output via the output pin 27. Similarly a single byte input register 145 is used to hold data which is input to the link unit via an input pin 26. An output READY INDICATOR 147 indicates that the output register 144 may be loaded via a bus 95 marked OUTPUT DATA connected to a data supply within the integrated circuit device on which the link is located. The bus 95 may supply the data as parallel signals into the register 144. The READY INDICATOR 147 indicates that the register 144 may be loaded by providing a control signal on line 94 marked OUTPUTACK. The indiciator 147 is cleared when data is loaded into the output register 144. Similarly an input READY INDICATOR 146 indicates by an INPUT DATA VALID signal 98 when data may be taken from the input register 145 on the INPUT DATA bus 97 leading to a data destination location within the integrated circuit device on which the link unit 37 is located. It will be appreciated that data is fed into the input register from the input pin 26. The input READY INDICATOR 146 is cleared when data is taken from the register 145. A packet generator 70 transmits data and acknowledge packets of the type described with reference to FIGS. 3 and 4 and a packet decoder 71 receives data and acknowledge packets from the input pin 26.

In operation the packet decoder 71 inspects the input pin 26 once every clock period, the clock period being determined by clock pulses from a clock 93. When the packet decoder detects a change of state of the input pin from 0 to 1 it inspects the input pin at the next clock period to determine whether the incoming packet is a data packet or an acknowledgement packet. On detection of an acknowledgement packet it sets the indicator 147 and continues to inspect the input pin to identify the start bit of the next packet. On detection of data packet, the packet decoder 71 inspects the input pin 26 at successive clock periods recording the successive states of the pin in the input register 145. When all data bits of the data packet have been taken from the pin 26 the packet decoder 71 sets the indicator 146 and continues to inspect the input pin to identify the start bit of the next packet. The packet decoder 71 incorporates counter means to count the bits received in each input packet.

The packet generator 70 inspects the state of indicator 146, inspects the state of the READY INDICATOR 147 and the READY INDICATOR 146 and sets the state of the output pin 27 every clock period. When data is loaded into the output register 144 and the indicator 147 cleared, the packet generator records that a data packet must be generated. Similarly when data is taken from the input register 145 and the READY INDICATOR 146 cleared, the packet generator 70 records that an acknowledge packet must be generated. An acknowledge packet is generated by setting the output pin to 1 and to 0. A data packet is generated by setting the output pin to 1 and then to 1 again and then to eight successive bits of the output register and then to 0. After each packet is generated the packet generator 70 determines whether a data packet or an acknowledge packet needs to be generated and if so commences to generate it. In the event that both a data packet and an acknowledge packet need to be generated the packet generator generates the acknowledge packet first.

Figure 7:
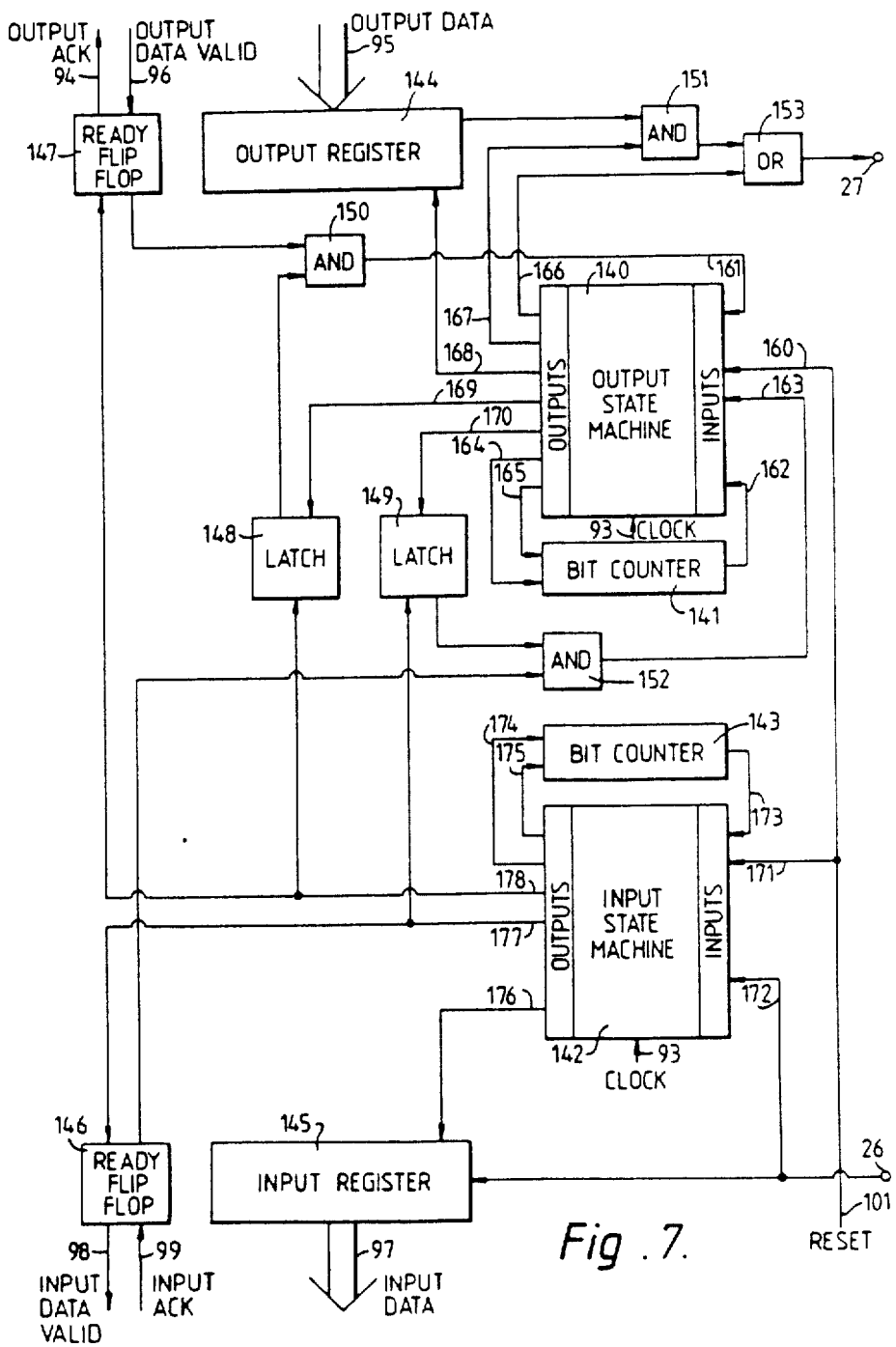
FIG. 7 illustrates more fully the arrangement shown in FIG. 6.

The link interface consists of an output channel, an input channel and control logic which is illustrated more fully in FIG. 7. The output channel includes an output state machine 140 with a bit counter 141 and the input channel includes an input state machine 142 having a bit counter 143. Each state machine consists of a state register to hold the current state of the machine and a programmable logic array which responds to the value of the state register and various input signals to the state machine in order to produce a predetermined pattern of output signals and a new value for the state register. The link further includes an output register 144 connected to the output data bus 95 and arranged to receive a byte of data. An input register 145 is connected to the input pin 26 in order to receive incoming data. The register 145 is connected to the input data bus 97 which may lead to a memory interfacein the device to which the link unit is attached. The link interface also includes two Ready Indicators, 146 and 147 which may each comprise a flip-flop. It further includes two latches 148 and 149 which may each comprise a flip-flop. It also includes three AND gate 150, 151 and 152 as well as an OR gate 153. The output state machine 140 has a plurality of inputs and outputs as follows:

| reference numeral | signal name | purpose |
|---|---|---|
| inputs: | | |
| 160 | Reset | Link interface reset connected to line 101 |
| 161 | Datago | Initiate data transmission |
| 162 | Countzero | Test if bit count zero |
| 163 | Ackgo | Initiate acknowledge transmission |
| outputs: | | |
| 164 | Loadcount | Set Bit Counter to number of bits to be transmitted |
| 165 | Deccount | Decrease bit counter by one |
| 166 | Oneout | Set output pin 27 to one |
| 167 | Dataout | Set output pin 27 to least significant bit of shift register |
| 168 | Shiftout | Shift data register one place |
| 169 | Datagone | Transmission of data complete |
| 170 | Ackgone | Transmission of acknowledge complete |

The input state machine 142 has inputs and outputs as follows:

| reference numeral | signal name | purpose |
|---|---|---|
| inputs: | | |
| 171 | Reset | Link interface reset connected to line 101 |
| 172 | Datain | Data from input pin 26 |
| 173 | Countzero | Test if bit count zero |
| outputs: | | |
| 174 | Loadcount | Set Bit Counter to number of bits to be received |
| 175 | Deccount | Decrease bit counter by one |
| 176 | Shiftin | Shift data register one place taking least significant bit from pin |
| 177 | Setdataready | Reception of data complete |
| 178 | Setackready | Reception of acknowledge complete |

The succession of states for the output state machine is as follows:

| OUTPUT STATE MACHINE 140 | | | |
|---|---|---|---|
| State | Inputs | Outputs | Next State |
| 1. any | Reset | | idle |
| 2. idle | (ΔDatago) / \ (ΔAckgo) | | idle |
| 3. idle | Ackgo | Oneout | ackflag |
| 4. idle | (ΔAckgo) / \ Datago | Oneout | dataflag |
| 5. ackflag | | Ackgone | idle |
| 6. dataflag | | Oneout Loadcount | databits |
| 7. databits | ΔCountzero | DecCount Shiftout Dataout | databits |
| 8. databits | Countzero | Datagone | idle |

The succession of states for the input state machine 142 are as follows:

| INPUT STATE MACHINE 142 | | | |
|---|---|---|---|
| State | Inputs | Outputs | Next State |
| 1. any | Reset | | idle |
| 2. idle | ΔDatain | | idle |
| 3. idle | Datain | | start |
| 4. start | ΔDatain | SetAckready | idle |
| 5. start | Datain | LoadCount | databits |
| 6. databits | ΔCountzero | Shiftin DecCount | databits |
| 7. databits | Countzero | Shiftin | dataend |
| 8. dataend | | SetDataready | idle |

For both state machines, where a specific output is listed under the output column, this means that a signal 1 is generated in order to indicate that specific output. At all other times the signal value of each output not listed is in the form of a zero. All inputs except those listed under the input column are ignored. The symbols V Λ and Δ are used to denote the boolean operations AND, OR and NOT respectively.

The purpose of the latch 148 is to control the output operation. Once a byte of data has been output the signal from output 169 sets the latch 148 to a state which controls the AND gate 150 to prevent further output until the latch 148 is reset by an acknowledge signal from output 178 from the input state machine. Similarly the latch 149 controls the input operation. When data has been received, the signal on line 177 sets the latch 149 to remember that data has been input until an acknowledgement is sent. It controls the AND gate 152 to permit an ACKGO input to the output state machine until the latch 149 is reset by the output 170 indicating that the acknowledge has gone.

The operation of this link interface is as follows. Consider first the situation where a device wishes to output data. The device causes data to be supplied to the output register along bus 95 and an output data valid signal 96 sets the Ready indicator 147. The output of the indicator 147 is fed to the AND gate 150 and the state of the latch 148 is such that a DataGo signal is input at 161. The output on pin 27 is derived through the OR gate 153 and therefore consists either of the signal on the output 166 from the output state machine or the output of the AND gate 151 dependent on the signal supplied on output 167 from the output state machine. As can be seen from the table of transitions for the output state machine 140, when the machine is idle after being reset there is no indicated output for line 166 and consequently this transmits a signal level to the output pin 27 indicating a zero. When the DataGo signal is applied at input 161 this corresponds to line number 4 of the state table where there is an input DataGo and no AckGo signal. As indicated this causes the signal Oneout on output 166. This feeds a signal 1 to the output pin 27 and forms the first bit of the data packet. The output state machine then moves to the state called "DataFlag" as can be seen from line 6 of the state table. In this condition with no further inputs the state machine causes a further Oneout signal on output 166 and a loadcount signal on output 164. This causes the second signal value 1 to be output by pin 27 thereby forming the two start bits of the data packet. The bit counter 141 is also loaded with the number of bits to be output which in this case would be 8. The output state machine is then in the state called "databits" and as can be seen from lines 7 and 8 of the state table, this provides a dataout signal to the AND gate 151 so as to allow the data contents of the register 144 to be output to the output pin 27. A shiftout signal on output 168 causes sequential discharge of the data from the register 144 with a consequential decrement in the count in the bit counter 141. When the counter reaches zero as shown in line 8 of the state table a Datagone signal is output at 169 which changes the latch 148 and removes the Datago signal from the input 1651. As can be seen from line 8 of the state table, no outputs on lines 166 and 167 are shown which means that the signal value 0 is resumed on line 166 which is fed through the OR gate 153 and the output pin 27 thereby forming the stop bit 0 at the end of the data packet. The output state machine returns to the idle condition.

The output channel may also be used to send an acknowledge packet. When the input channel has received a byte of ata it sends a signal to the output state machine in order to output an acknowledge packet. A signal is fed to the AND gate 152 from the Ready Indicator 146 and the state of the latch 149 at this time permits the ACKGO signal to be applied to input 163 of the output state machine 140. This corresponds to line 3 of the state table for the output state machine 140 and as can be seen, this causes the output oneout on the output 166. This is passed through the OR gate 153 so that the signal level on pin 27 is changed from the previous zero level to indicate a 1 forming the first bit of the acknowledge packet. This changes the output state machine 140 to the state called ACKFLAG and as can be seen from line 5 of the state table for that machine, this causes no further outputs on lines 166 and 167 and this means that the signal level on output 166 changes back to the zero level so that the signal level on the output 27 reverts to zero giving the second bit of the acknowledge packet. The output state machine 140 also causes an output ACKGONE on line 170 so as to change the state of the latch 149 and thereby alter the output of the AND gate 152 so that the ACKGO signal is removed from the input 163. The state machine then returns to the idle state.

The operation of the input state machine 142 will now be described. The machine is reset by a reset signal on line 101 and in accordance with line 1 of the state table for the input state machine 142 this causes no listed outputs but puts the state machine into the idle state. As no outputs are listed the signals on all outputs will have a zero signal level. Input 172 is connected to the input pin 26 and so long as there is no DataIn signal the machine remains idle in accordance with line 2 of the state table. As soon as a DataIn signal is received at input 172 due to the arrival of a start bit of either a data packet or an acknowledge packet the state machine moves onto line 3 of the state table causing no listed output but moving to the state called start. if the next bit to arrive at the input pin 26 is a 0 in accordance with the acknowledge packet then line 4 of the state table for the input state machine 142 will apply. The machine has been put into the state called start by the arrival of the first bit of the packet but as the second bit is a 0 there is no longer a DataIn signal on line 172 and in accordance with line 4 of the state table this causes the output SETACKREADY on output 178 and the machine returns to the idle state. The output on line 178 is fed to the latch 148 in order to indicate to the output state machine that an acknowledge packet has been received. It is also fed to the Ready Indicator 147.

If however the second bit of the packet arriving at the input pin 26 was a 1 rather than a 0 such that the packet is a data packet, then line 5 of the state table would apply in that the machine is in the start state due to the first bit of the data packet and the input is now DataIn on input 172. This causes the output loadcount on output 174 so that the bit counter 143 is loaded with the number of bits to be expected in the data packet. In this case the number of bits will be 8 corresponding to 1 byte of data. The machine moves to the new state databits and as can be seen from line 6 of the state table, so long as the input 173 does not reach zero the state machine continues to cause a succession of operations of moving the incoming bits successively along the input register 145 due to the shiftin signal on the output line 176 and it causes progressive decrease in the counter 143 due to the DECCOUNT signal on the output 175. When the count in the counter 143 reaches zero indicating that the required 8 bits of data have now been received, line 7 of the input state machine table applies in that the machine is still in the state databits and a count zero signal is received on line 173. This causes a shiftin output on line 176 to move the last databit into the input register 145 and the machine changes to the dataend state. Line 8 of the state table indicates that in this condition a Set-Dataready signal is output on line 177 to alter the latch 149 and the Ready Indicator 146. The input state machine 142 then returns to the idle state. The Set-Dataready signal which was supplied to the Ready Indicator 146 causes the signal "input data valid" on line 98 to indicate that a full byte of data has now been received by the input register 145.

Figure 4:
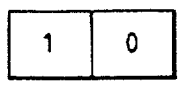
FIG. 4 illustrates the form of an acknowledgement packet transmitted by a link interface in accordance with the present invention.

It will therefore be seen that the link interface shown in FIG. 7 provides a packet generator in the form of the output state machine 140 with the associated bit counter latches and gates so that data may be output in packets of the type shown in FIG. 3 or acknowledge of the type shown in FIG. 4. The input state machine 142 forms a packet decoder together with its bit counter and latches which can distinguish between receipt at the input pin 26 of an acknowledge packet or a data packet. In the case of a data packet it loads the input register 145 and provides an output from the Ready Indicator 146 when a complete byte has been received. In the case of an acknowledge packet it does not load the input register 145 but causes an output signal for use in controlling the output of the next data packet. That output signal alters latch 148 to permit transmission of the next datago signal through the AND gate 150. It also causes the output ACK signal on line 94 to indicate that a further byte to be output can now be supplied along bus 95 to the output register 144. When a byte of data has been received by the input register 145 and then transferred to its destination via bus 97, an input acknowledge signal is generated for line 99 so that an acknowledge packet must be sent by the output pin 27 before another byte of data can be input.

It will be seen that by use of the link interface shown in FIG. 7, a message may consist of one or more bytes of data each byte being separately transmitted in a packet of the type shown in FIG. 3. As each packet of the type shown in FIG. 3 is received by an input pin an acknowledge of the type shown in FIG. 4 must be output by the associated output pin before the next data packet can be input. Similarly the output pin must away an acknowledgment packet for each data packet which is output before it can proceed to outputting the next data packet. Each byte must be separately sent and acknowledged.

In the above described example both state machines in the link interface are supplied with timing pulses from a common clock. This will be used in controlling the bit frequency of the data and acknowledge packets transmitted by the output pin 27.

Figure 8:
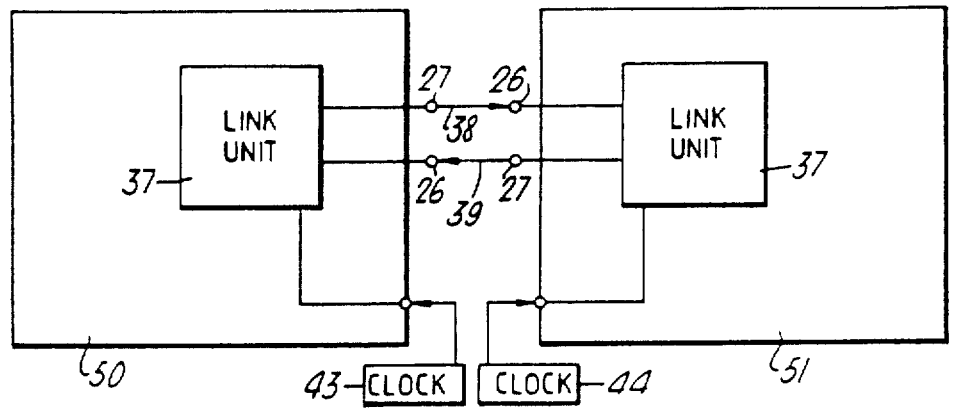
FIG. 8 illustrates an arrangement similar to FIG. 5 but using separate clock pulses.
Figure 9:
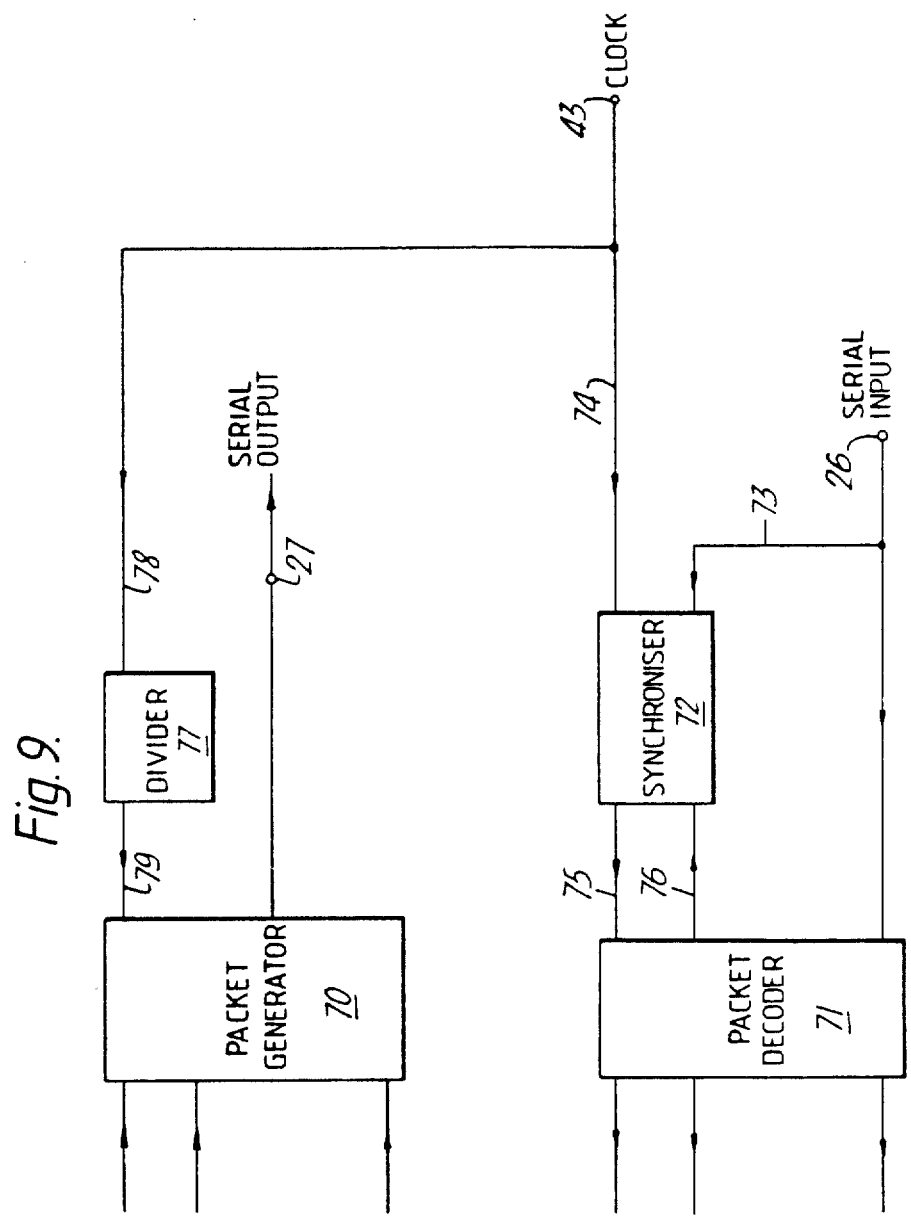
FIG. 9 illustrates a modified arrangement for the packet generator and packet decoder when used with the arrangement of FIG. 8.

In the event that it is inconvenient to distribute the same clock signal to two or more link units in a network, a synchronising device may be incorporated to ensure that the input pin of each link is inspected at the correct time. FIG. 8 shows an arrangement similar to FIG. 5 in which the signal clock 93 is replaced by two separate clocks 43 and 44. These two clocks have a common frequency but an unknown or varying phase relationship. In such a case the link unit 37 may be modified as shown in FIG. 9. This illustrates a modified arrangement for the packet generator 70 and packet decoer 71 of the link unit of the device 50 which receives signals from the clock 43. A similar arrangement would be provided for the link unit 37 on device 51. The clock 43 provides clocks pulses on lines 78 to a divider 77 which may divide the pulse frequency by three so that the packet generator 70 receives on line 79 one clock pulse for every three cycles of the clock 43. The packet decoder 71 receives clock pulses through synchronizer 72. The purpose of the synchronizer 72 is to ensure that the packet decoder 71 only inspects the input pin 26 when the state of the pin is not changing as for example occurs on change of signal level from 0 to 1 at the beginning of a start bit of a packet. The synchronizer 72 is connected to the pin 26 via line 73 and inspects the input pin 26 every clock period unitl the change from 0 to 1 is detected. Starting one clock period later, it outputs a clock pulse on line 75 to the packet decoder 71 and it supplies a clock signal on line 74 for every three clock periods of the clock 43. On detection of the last bit of a packet, the packet decoder 71 resets the synchronizer 72 by a reset signal on line 76 so that the synchronizer is synchronized with the next start bit of a new packet.

It will be appreciated that in the arrangement of FIG. 9 the frequency of the bit signals supplied on lines 38 and 39 between two interconnected link units will be one-third of the frequency of the clock 43 and consequently the clock 43 acts as a relatively high frequency clock permitting the synchronizer to sample the input signals at a frequency well in excess of the bit frequency. This enables the synchronizer 72 to detect the leading edge of an incoming bit and to arrange for the packet decoder to respond to the signal level on input pin 26 at suitable time intervals delayed from detection of the leading edge of a start bit such that a valid signal is obtained by the packet decoder 71.

It will be appreciated that in the above example the divider 77 is not restricted to dividing by three. The clock 43 may operate at frequencies more than three times that required on the input line 79 to the packet generator 70. For example it may operate at five or more times the frequency. For example, if n is the number of clock periods necessary to transmit each bit by the packet decoder, the synchronizer 72 may operate by detecting a change from 0 to 1 and then counting n÷2 clock periods before outputting clock pulses to the packet decoder every n clock periods.

Figure 10:
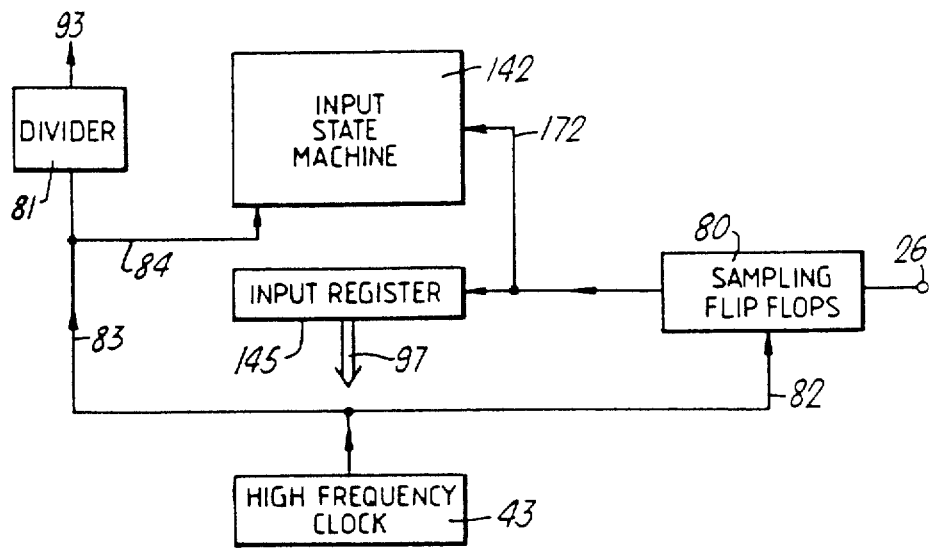
FIG. 10 shows a modification of part of FIG. 7 for use with the arrangement shown in FIG. 8.
Figure 11:
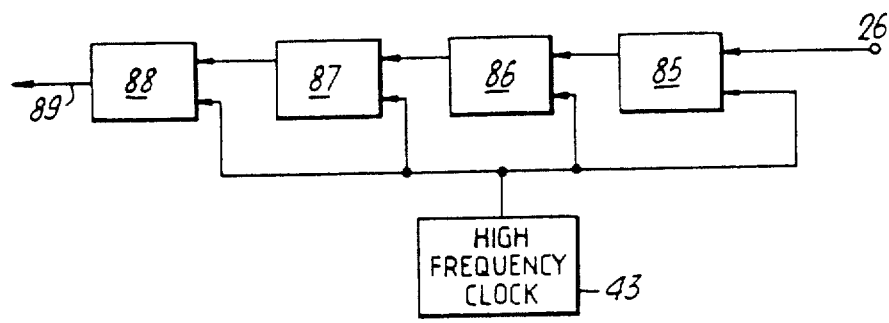
FIG. 11 shows further detail of part of the arrangement shown in FIG. 10
Figure 12:
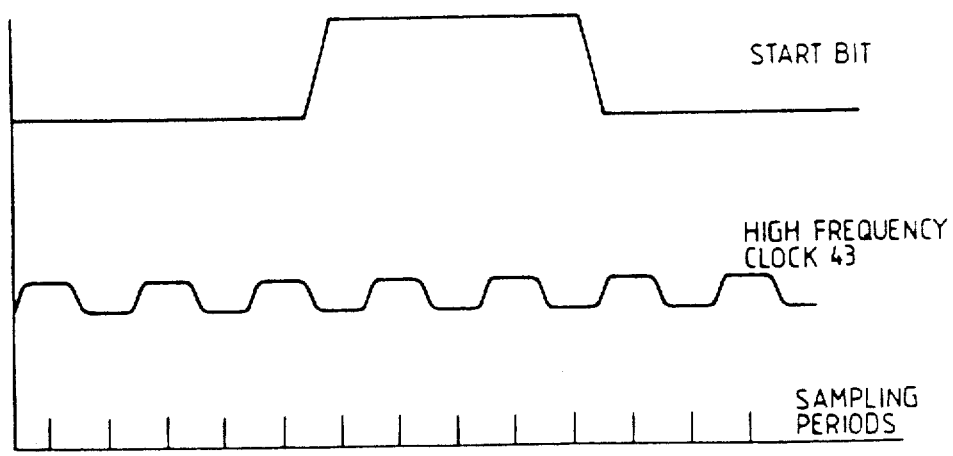
FIG. 12 is a signal diagram for use in explaining the operation of FIGS. 10 and 11.

An alternative arrangement for enabling the link units 37 to operate with separate clocks is shown in FIGS. 10, 11 and 12. FIG. 10 shows a modification to the input channel to the link interface shown in FIG. 7. Similar numerals have been used for similar parts. In this case a high frequency clock 43 operates at five times the required clock frequency 93 which is fed to the output state machine 140. The input signal from pin 26 is fed through a sequence of sampling flip-flops 80 which provides an output to the register 145 and also supplies a signal on line 172 to the input state machine 142. The high frequency clock pulses are supplied on line 82 to the sampling flip-flops 80 and to the input 84 to the input state machine 142. A line 83 connects the high frequency clock 43 to a divider 81 which divides the high frequency clock pulses by five and provides clock pulses on line 93 for use by the rest of the link interface. The sampling flip-flops are shown more fully in FIG. 11 which shows that the input pin 26 is connected to a succession of four sampling flip-flops 85, 86, 87 and 88. Each flip-flop provides an output to the next flip-flop in the chain. Each flip-flop also has an input from the high frequency clock 43. FIG. 12 illustrates a start bit having a frequency determined by the clock pulses 93. It also shows the high frequency clock signal from clock 43 and the sampling periods which result from the use of the flip-flops shown in FIG. 11. By use of the high frequency clock as shown in FIG. 12, each flip-flop in the chain of FIG. 11 samples the signal level on the input line from pin 26 at the sampling periods indicated in FIG. 12. That indicates that the signal level is sampled five times for the duration of each bit of a packet. The sampling is done continuously at the fixed frequency of the high frequency clock. Generally a change in signal level from 0 to 1 at the input pin 26 will arrive between two successive samples. consequently one sample will show a value 0 while the next sample shows the value 1. If however the change coincides with a sample being taken the first sampling flip-flop 85 may go metastable. The flip-flops in the chain shown in FIG. 11 are arranged that when the high frequency clock sets the flip-flop to take a sample, the output of the flip-flop follows the input level. Between samples the flip-flop retains the state of its input when the last sample was terminated and applies strong positive feedback to resolve the state to a 0 or 1. If the input was changing between 0 and 1 at the end of the last sample the flip-flop will take some time to resolve the state and this may take longer than one clock phase. In this event, the next sampling period will cause the output from flip-flop 25 to be passed to flip-flop 86 which will have a further opportunity to resolve the state between 0 or 1. This occurs repeatedly with each of flip-flops 87 and 88 having further opportunities to resolve an output in any case where the first flip-flop 85 took the sample at a time of changing signal level between 0 and 1. In this way the output 89 from the chain of flip-flops will have decided whether the sample has signal level 0 or 1 and will therefore enable detection of the leading edge of a start bit of each packet arriving at pin 26.

In this arrangement the sequence of states of the input state machine 142 are arranged to receive inputs on line 172 at the frequency of the high frequency clock 43. In order to cause data to be loaded into the input register 145 at a time which corresponds approximately to the centre of each bit in the incoming bit pattern, the transition table for the input state machine 142 is modified as follows:

| | INPUT STATE MACHINE | | |
|---|---|---|---|
| State | Inputs | Outputs | Next state |
| 1. any | Reset | | idle |
| 2. idle | Δ Datain | | idle |
| 3. idle | Datain | | start0 |
| 4. start0 | | | start1 |
| 5. start1 | | | start2 |
| 6. start2 | | | start3 |
| 7. start3 | | | start4 |
| 8. start4 | | | start5 |
| 9. start5 | | | start |
| 10. start | Δ Datain | SetAckready | idle |
| 11. start | Datain | LoadCount | databits0 |
| 12. databits0 | | | databits1 |
| 13. databits1 | | | databits2 |
| 14. databits2 | | | databits3 |
| 15. databits3 | | | databits |
| 16. databits | Δ Countzero | Shiftin DecCount | databits0 |

-continued

| | INPUT STATE MACHINE | | |
|---|---|---|---|
| State | Inputs | Outputs | Next state |
| 17. databits | Countzero | Shiftin | dataend0 |
| 18. dataend0 | | | dataend1 |
| 19. dataend1 | | | dataend2 |
| 20. dataend2 | | | dataend3 |
| 21. dataend3 | | | dataend |
| 22. dataend | | SetDatready | idle |

It will be seen that in this case the input stage machine 142 is changing state at the high frequency of the clock 43. The first signal on line 89 which detects a start bit at the beginning of a packet will cause a signal Datain in accordance with line 3 of the transition table. The machine then waits for seven high frequency clock periods before checking in accordance with lines 10 and 11 whether the output from the sampling flip-flop 80 corresponds to another Datain signal. If the signal on lin 89 indicates that a data packet is arriving, the state machine recycles through lines 12 to 16 for each bit period so that data is advanced into the input register 145 only once in each five high frequency clock pulse periods. Furthermore lines 18 to 21 of the above state table delay the output SetDatready to match the lower clock frequency of the clock pulses 93.

It will be appreciated that the link units 37 may each comprise a separate unit having suitable connections for attachment to other devices. In this way each can be attached as an adaptor unit to enable standard communication within a network for devices that are otherwise unable to communicate in that network.

The invention is not limited to the details of the foregoing example. It will be understood that the term microcomputer relates to smallsize computers generally based on integrated circuit devices but it does not impose any limit on how small the computer may be.

We claim:

1. A communication system interconnecting a first device with a second device, at least one of said devices comprising a microcomputer, said system comprising:
   (A) a first communication interface connected to said first device,
   (B) a second communication interface connected to said second device, each said communication interfaces being a synchronized bidirectional communication interface and comprising
      (i) an output channel for outputting data, said output channel including an output terminal for transmitting data bits serially in an output direction only,
      (ii) an input channel for receiving data, said input channel including an input terminal for receiving bits serially in an input direction only,
      (iii) a packet generator coupled to said output terminal for outputting serial bit packets of first and second types respectively comprising data packets having a first format and acknowledgement packets having a second format, whereby the interface may be used in bi-directional communication with a similar interface,
      (iv) a packet decoder coupled to said input terminal for receiving serial bit packets of both said types and detecting whether each received packet is of the first format or of the second format, and
      (v) interlock control circuitry coupled to the packet generator and to the packet decoder, said interlock control circuitry being operable to prevent output of an acknowledgement packet by said packet generator until receipt of a data packet by said input channel, said interlock control circuitry being responsive to the output of one data packet to prevent the output of a further data packet until said input channel has received an acknowledgement packet, whereby a synchronizing interlock is provided between the input and output channels of the interface,
   (C) a first uni-directional communication line solely interconnecting the output terminal of said first communication interface with the input terminal of said second communication interface, thereby to transmit along the same first communication line data packets from the first device to the second device and acknowledgement packets from the first device to the second device, and
   (D) a second uni-directional communication line solely interconnecting the output terminal of said second communication interface with the input terminal of the said first communication interface, thereby to transmit along the same second communication line data packets from the second device to the first device and acknowledgement packets from the second device to the first device.

2. A network of interconnected devices including a plurality of microcomputers, said network having a communication system according to claim 1 interconnecting each pair of devices.

3. A network according to claim 2 wherein different devices within the network have different timing clocks providing signals of a common frequency.

4. A communication interface according to claim 1 wherein in each communication interface, said packet generator includes means for controlling the length of each packet so that a data packet includes a standard number of data bits.

5. A communication interface according to claim 4 in which said packet generator generates data packets each containing 8 bits of data.

6. A communication interface according to claim 4 in which said packet generator includes a first counter coupled to count each data bit which is outputted in a said packet and to provide a signal indicating when the number of data bits reaches a predetermined standard, whereby the packet generator outputs a predetermined signal to indicate termination of the data packet.

7. A communication interface according to claim 6 in which said packet decoder includes a second counter coupled to count the number of data bits received in an incoming data packet, said packet decoder providing a further signal when the number of data bits reaches said predetermined standard, said further signal being coupled to said interlock control circuitry to initiate action by said packet generator to output an acknowledgement packet.

8. A communication interface according to claim 1 in which said packet generator includes means for generating a bit pattern having said first format followed by a succession of data bits in order to output a data packet and for generating a bit pattern having said second format without being followed by data bits in order to output an acknowledgement packet.

9. A communication interface according to claim 8 in which said first and second format are each determined by two bits at the start of each packet.

10. A communication interface according to claim 1 in which said output channel includes a first single byte register, coupled to said packet generator, for holding eight data bits to be output by sad packet generator.

11. A communication interface according to claim 10 in which said input channel includes a second single byte register, coupled to said packet decoder, for holding eight data bits received by the input channel.

12. A communication interface according to claim 1; said interlock control circuitry comprising a first latch settable to a first condition in which it provides an output signal to permit output of a data packet by said packet generator and settable to a second condition in which it inhibits the output of a data packet,
said first latch being coupled to receive a signal from said packet decoder on receipt of an acknowledgement packet by the input channel in order to set said first latch to said first condition, and
said first latch being coupled to receive a signal from said packet generator to set said first latch to said second condition on completion of a data packet output.

13. A communication interface according to claim 12, said interlock control circuitry including a second latch settable to a first condition in which it provides a signal indicating to said packet generator that an acknowledgement packet should be output, and settable to a second condition in which it does not provide such a signal,
said second latch being coupled to receive an input responsive to the packet decoder to indicate that a data packet has been received by said input channel and thereby set said second latch to said first condition in order to cause output of an acknowledgement packet,
said second latch having a further input responsive to output of an acknowledgement packet by said packet generator in order to set said second latch means to said second condition.

14. A communication interface according to claim 1 further comprising first timing means for providing clock pulses to said packet generator and packet decoder to control signal timing therein.

15. A communication interface according to claim 14, said output channel including a second timing means coupled to said first timing means, said second timing means providing a signals at a predetermined frequency and phase,
said input channel including signal synchronizing means coupled to said first timing means to synchronize incoming signals of the same frequency as said predetermined frequency but having a different phase,
said synchronizing means including means for sampling signals received at said input terminal at a frequency higher than said predetermined frequency.

16. A communication interface according to claim 15 in which said means for sampling samples signal levels at said input terminal at a frequency higher than the bit frequency of the incoming signal in order to detect a leading edge of a first bit of a packet, said means for sampling also supplying to said packet decoder signal levels after a time interval from the detection of said leading edge so that the signal level provides a true indication of the bit pattern in the incoming packet, regardless of the phase of the incoming packet signals.

17. A communication interface according to claim 16 in which said synchronizing means includes a plurality of interconnected sampling flip-flops for detecting the leading edge of the first bit of a packet.

18. A communication interface according to claim 1 further comprising means for connection to a device to which the interface is to be attached for communication purpose, said means for connection comprising an input data path, an input control signal line, an output data transmission path, and an output control signal line.

19. A method of effecting bi-directional synchronized communication between a microcomputer and an interconnected device each having a communication interface, which method comprises:
interconnecting an output channel of a first interface with an input channel of a second interface by a first non-shared, unidirectional communication line which solely interconnects said output channel of said first interface with said input channel of said second interface;
interconnecting an input channel of said first interface with an output channel of said second interface by a second, non-shared, unidirectional communication line which solely interconnects said input channel of said first interface with said output channel of said second interface;
outputting data from said first interface by generating a serial bit data packet having a first format and transmitting said data packet through the output channel of said first interface and said first communication line to the input channel of said second interface;
preventing the output of a further data packet by the output channel of said first interface until an acknowledgement packet has been received by the input channel of said first interface;
receiving and decoding the data packet at the input channel of said second interface, and in response to the detection of a data packet conforming to said first format, causing the output channel of said second interface to generate and output along said second communication line a serial bit packet comprising an acknowledgement packet of a second format;
receiving said acknowledgement packet at the input channel of said first interface, decoding said acknowledgement packet, and in response to determining that it conforms to said second format, permitting the output channel of said first interface to output a further data packet;
outputting data from said second interface by generating a serial bit data packet having a first format and transmitting said data packet through the output channel of said second interface and said second communication line to the input channel of said first interface;
preventing the output of a further data packet by the output channel of said second interface until an acknowledgement packet has been received by the input channel of said second interface;
receiving and decoding the data packet at the input channel of said first interface, and in response to the detection of a data packet conforming to said first format, causing the output channel of said first interface to generate and output along said first communication line a serial bit packet comprising an acknowledgement packet of a second format; and
receiving said acknowledgement packet at the input channel of said second interface, decoding said acknowledgement packet, and in response to determining that it conforms to said second format, permitting the output channel of said second interface to output a further data packet.

* * * * *